Patented Mar. 26, 1940

2,194,479

UNITED STATES PATENT OFFICE 2,194,479

SULPHIDE PIGMENT

Kenneth S. Mowlds, Baltimore, Md., assignor to The Glidden Company, Cleveland, Ohio, a corporation of Ohio No Drawing. Application September 2, 1936, Serial No. 99,146

13 Claims. (Cl. 134—78)

This invention relates to sulphide pigments, and has particular reference to a new and novel pigment composition especially adapted for use in the wall paper industry. More particularly, it contemplates the use of sulphide pigments containing small quantities of water soluble thiocyanates, to overcome the most serious objection of the wall paper industry to these pigments—their property of darkening in many instances for apparently no reason.

Lithopone, zinc sulphide and similar sulphide pigments are used in the wall paper industry, along with other pigments, either as pigmented fillers in the body of the paper, or in printing the paper with designs. Because of its low cost, and its excellent pigment properties in the watery mediums generally used in wall paper, lithopone has been used to some extent in the industry. Unfortunately, its use has been limited by the fact that batches of wall paper, made with it, would darken in many cases without apparent reason.

On investigation, I have found that the darkening of wall paper containing lithopone is due to a reaction between the sulphide pigment and copper salts, which may be present on the wall to be papered, generally as a mold inhibitor in the paste used on the old paper. When the paper is pasted up, the moisture in the paste soaks through the old paper, dissolves the copper and brings it through to the face of the paper, to react with the sulphide pigment to form black copper sulphide.

I have further discovered that the tendency to darken may be entirely overcome by incorporating with the pigment a small percentage of a water soluble thiocyanate. I believe the thiocyanate prevents darkening by reacting with the copper to precipitate copper thiocyanate, before the copper can react with the sulphide to form the black copper sulphide.

The thiocyanate may be added to the pigment at any time. It may be added dry to the pigment, and thoroughly mixed; or it may be dissolved in the watery fluid in which the pigment is suspended during the manufacture of the wall paper. For the sake of convenience, and to insure uniform distribution, I prefer to add it to the finished wet pigment slurry, just before drying. The pigment slurry is preferably thick, so that while the thiocyanate dissolves and is evenly distributed over the pigment, as little as possible is lost on filtration.

Relatively small percentages of thiocyanate are effective if even distribution over the pigment is obtained. I prefer to use about 1%, based on the pigment content of the slurry, to insure non-darkening even under very adverse circumstances. Any addition, of course, gives protection; amounts as low as 0.1% give good results for most purposes, although higher percentages are needed where a copper mold inhibitor is used in the paste with the wall paper. Higher percentages may be used, but cost is increased unnecessarily and pigment properties are diluted.

A typical example of my invention comprises adding 10 pounds of sodium thiocyanate to a thick slurry of calcined lithopone containing 1,000 pounds of pigment. The slurry is agitated to insure distribution of the salt; the pigment is then filtered and dried.

I prefer, of course, to use sodium thiocyanate because of its low cost; but any other water soluble thiocyanate gives the same results.

In addition to lithopone, mixed pigments containing zinc sulphide and cadmium sulphide give the same results.

I claim:

1. A white pigment composition comprising a sulphide, and a water soluble thiocyanate.

2. A pigment composition comprising zinc sulphide and a water soluble thiocyanate.

3. A pigment composition comprising a zinc sulphide pigment, and a small percentage of sodium thiocyanate.

4. In the pigmentation of paper, the step which comprises addition of a white sulphide pigment together with a water soluble thiocyanate.

5. In the pigmentation of paper, the step which comprises the addition of zinc sulphide together with a water soluble thiocyanate.

6. A white pigment composition comprising a sulphide pigment and a water soluble thiocyanate.

7. In the process of preparing a white sulphide containing pigment the step comprising adding to said pigment a water soluble thiocyanate.

8. The process of preparing a white sulphide pigment which will not be discolored by copper, the step which comprises adding to said pigment a water soluble thiocyanate.

9. A pigment composition comprising a lithopone pigment and a water soluble thiocyanate.

10. In the pigmentation of paper, the step which comprises the addition of a white pigment composition comprising a sulphide and a water soluble thiocyanate.

11. A pigment composition comprising calcined lithopone and a water soluble thiocyanate salt.

12. A pigment composition comprising a water soluble thiocyanate salt and a white calcined sulphide pigment.

13. A pigment composition comprising a mixture of a white sulphide pigment and a cadmium sulphide pigment and a water soluble thiocyanate.

KENNETH S. MOWLDS.